United States Patent [19]

Holmes et al.

[11] Patent Number: 4,640,201

[45] Date of Patent: Feb. 3, 1987

[54] FLUIDIZED BED COMBUSTOR HAVING INTEGRAL SOLIDS SEPARATOR

[75] Inventors: Myron L. Holmes, Simsbury; Leo A. Smolensky, W. Hartford, both of Conn.

[73] Assignee: Combustion Engineering, Inc., Windsor, Conn.

[21] Appl. No.: 858,138

[22] Filed: Apr. 30, 1986

[51] Int. Cl.$^4$ ............................ F23G 5/00; F23G 7/00
[52] U.S. Cl. .................................. 110/245; 110/216; 110/263; 122/4 D
[58] Field of Search ............... 110/347, 263, 264, 245, 110/216; 122/4 D; 165/104.16; 431/7, 170

[56] References Cited

U.S. PATENT DOCUMENTS

| 4,442,795 | 4/1984 | Strohmeyer, Jr. | 122/4 D |
| 4,445,844 | 5/1984 | Matthews | 431/170 |
| 4,454,838 | 6/1984 | Strohmeyer, Jr. | 122/4 D |

*Primary Examiner*—Edward G. Favors
*Attorney, Agent, or Firm*—William W. Habelt

[57] ABSTRACT

A circulating fluidized bed furnace (10) is disclosed wherein a non-cyclonic particulate separator (18) is integrally disposed in the flue gas flow path between the furnace gas outlet (14) and the flue gas duct (16). The separator (18) comprises an arcuate duct (20) having a curvilinear inner wall (24), the portion thereof which is disposed across the inlet to the flue gas duct (16) having a plurality of openings (28) therein which provide a flow area through which a portion of the flue gas pass into the flue gas duct (16). Gas/solids separation is accomplished as the flue gas turns sharply from its arcuate path to pass through the openings (28) in the inner wall (24). The momentum of the particulate solids and the centrifugal forces acting thereon prevent the solids from sharply turning and cause the solids to continue on their arcuate flow path through the duct (20) in the remaining flue gas to a solids collection means (40) opening to the solids outlet (26) of the arcuate duct (20).

7 Claims, 7 Drawing Figures

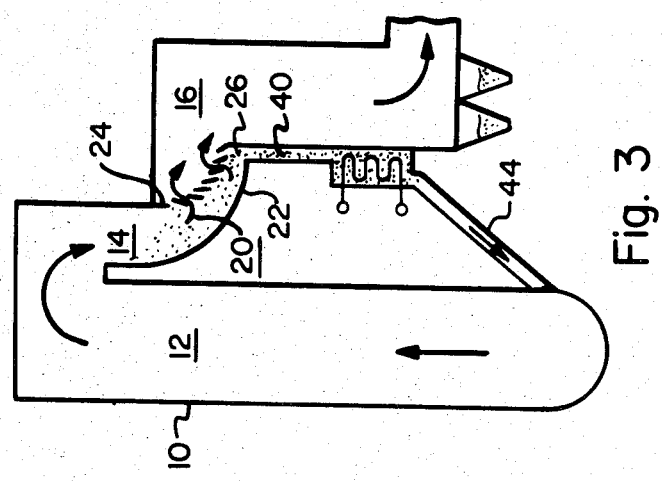

FLUIDIZED BED COMBUSTOR HAVING INTEGRAL SOLIDS SEPARATOR

BACKGROUND OF THE INVENTION

The present invention relates to fluidized bed combustors wherein a particulate fuel is combusted in a fluidized state, and, more particularly, to such a combustor having an integral solids separator for removing particulate material carried over in the flue gas generated in the combustion chamber.

In a typical present day fluidized bed combustor, particulate fuel, such as coal having a top size ranging up to about 6.5 millimeters, is typically fed to and combusted within a furnace chamber in a fluidized state in a fluidizing gas at relatively low temperatures ranging from about 760° C. to 925° C. Fluidized bed furnaces are particularly adaptable to burning sulfur containing fuels as the particulate material fluidized within the furnace may include a sulfur absorbent, most commonly crushed limestone, in addition to the particulate fuel. Fluidizing air, which also serves as combustion air, is supplied to the furnace from an air plenum located beneath the combustion chamber. In a typical circulating fluidized bed, also referred to as a fast fluidized bed, the velocity or flow rate of the fluidizing air being passed upwardly into the furnace is maintained at a level sufficiently high to entrain most of the particulate material present within the furnace such that a substantial portion of the particulate material within the combustion chamber is carried therefrom with the flue gas.

Accordingly, it is necessary on circulating or fast fluidized bed combustors to provide a means for removing the particulate material carried over from the combustion chamber with the flue gas prior to venting the flue gas to the atmosphere. As this particulate material typically contains a significant amount of unburned fuel, it is further advantageous to collect the particulate material from the gas stream for recycle to the combustion chamber of the furnace for further combustion in order to increase the efficiency of fuel utilization. Additionally, the particulate material removed from the gas stream will generally contain a significant amount of unreacted sulfur absorbent which is also recirculated to the combustion chamber of the furnace in order to increase the efficiency of utilization of the sulfur absorbent.

The most common means for separating the particulate solids from the flue gas passing from the combustion chamber prior to venting same to the atmosphere is a cyclone separator. A circulating fluidized bed system utilizing a cyclone for a particulate collection is illustrated in U.S. Pat. No. 4,111,158. As shown, the cyclone is typically installed immediately downstream of the furnace in order to facilitate recycle of the collected particulate material to the furnace. As the particulate solids entrained in the flue gas will have a temperature reflecting the temperature of the flue gas, the cyclone separator will be exposed to both hot solids and hot gases and therefore must be designed to withstand temperatures ranging as high as 1600° C. under normal operation. Additionally, the cyclone separator must be designed to survive operation in a highly erosive environment as the particulate loading in the flue gas will result in a significant impact of erosive particles on the side walls of the cyclone. Accordingly, the type of cyclone suitable for utilization in a circulating fluidized bed system has a high capital cost and frequently a high operating cost associated therewith.

It would be desirable to substitute a less expensive separating means for the cyclone on a typical circulating fluidized bed furnace. Examples of such circulating fluidized bed furnace systems utilizing non-cyclonic separators are illustrated in U.S. Pat. Nos. 4,442,797 and 4,538,549 which show, respectively, the use of momentum separators and the use of impact separators for removing particulate material from the flue gas passing from the combustion chamber.

In U.S. Pat. Nos. 4,442,797, the flue gas passing from the furnace chamber to the flue gas vent duct must exit the furnace chamber through a plurality of vertical slot-like openings formed by bending the waterwall tubes in the upper wall of the combustion chamber inwardly from the plane of the wall to provide a flow area between adjacent tubes. A plenum chamber extends in belt-like fashion around the upper region of the furnace chamber to receive the flue gas which passes through these tubes. As the flue gas passes through the slot-like openings formed between tubes, the flue gas drops in velocity below the entrainment level and the particles carried therein drop out of the flue gas stream and are directed to a collection hopper for recycle to the furnace chamber.

In U.S. Pat. No. 4,538,549, impact beams are provided at and immediately downstream of the gas outlet of the furnace chamber. The flue gas leaving the combustion chamber of the furnace passes between the rows of impact beams while the particulate solids contained therein, due to their flow inertia, strike the impact beams. As a consequence of striking the impact beams, the particles lose their momentum and drop out of the gas stream into a collection hopper for recycle to the furnace while the flue gas passes on to the vent stack.

It is an object of the present invention to provide a fluidized bed combustor having an integral non-cyclonic solids separator for removing the hot particulate solids carried in a flue gas stream prior to venting the flue gas stream to the atmosphere.

SUMMARY OF THE INVENTION

A circulating fluidized bed combustor system for burning a particulate fuel in a fluidized state in a fluidizing gas comprising a furnace enclosure defining a combustion chamber having a hot gas outlet, a flue gas duct disposed downstream of the furnace enclosure for venting the flue gas generated in the combustion chamber, separator means integrally incorporated into the gas flow path downstream of the furnace chamber and upstream of the flue gas duct for separating particulate solids carried over from the furnace chamber in the flue gas, and solids collection means for receiving particulate solids from the separator means.

The separator means comprises an arcuate duct having an inlet opening to the gas outlet of the furnace enclosure for receiving the hot flue gas from the chamber and an outlet spaced from the inlet. The arcuate duct comprises spaced curvilinear inner and outer walls extending from the inlet of the duct to the outlet of the duct, and a pair of spaced sidewalls extending transversely between the spaced inner and outer walls. A portion of the curvilinear inner wall of the arcuate duct comprising separator means is disposed across the flue gas duct inlet and has a plurality of openings formed therein for providing a flow area through which a first major portion of the hot flue gas passes from the arcuate duct of the separator means into the flue gas duct for venting to the atmosphere. A second minor portion of the flue gas passes through the outlet of the arcuate duct into the solid collection means and carries with it the particulate solids separated from the first portion of the flue gas passing through the inner wall of the arcuate duct of the separator means. Due to the curvilinear shape of the arcuate duct, centrifugal forces are generated which act on the particles passing through the separator means so as to cause the particles within the flue gas passing therethrough to concentrate along the curvilinear outer wall of the arcuate duct.

The particulate solids contained in the first portion of the flue gas passing through the openings in the inner wall of the arcuate duct have sufficient momentum so that they do not follow the path of the first portion of the flue gas through the openings in the inner wall of the arcuate duct, but rather pass to the outlet of the arcuate duct and are carried in a second minor portion of the flue gas along the outer curvilinear wall of the arcuate duct through the outlet into the solids collection means.

Preferably, the portion of the inner curvilinear wall of the arcuate duct of the separator means disposed across the inlet to the flue gas duct comprises a plurality of spaced louvers disposed transversely between the spaced sidewalls of the arcuate duct so as to provide a plurality of openings therebetween. Each of the louvers is disposed at an acute angle with the local tangent to the curvilinear inner wall whereby the first portion of the flue gas which passes through the openings therein must sharply change its direction of flow, while the solid particles, being under the influence of much higher inertia forces, separate from the first portion of flue gas as it changes direction of flow to pass through the openings between the louvers, and continue along the curvilinear flow path through the arcuate duct to be concentrated by centrifugal forces in a second minor portion of the flue gas which passes along the outer curvilinear wall of the arcuate duct to the solid collection means disposed at the outlet of the arcuate duct.

BRIEF DESCRIPTION OF THE DRAWING

The features and advantages and objects of the present invention will be evident from the following description of the illustrated embodiments thereof in the accompanying drawing wherein:

FIG. 3 is a side elevational view of an alternate embodiment of a fluidized bed boiler system incorporating a non-cyclonic solids separator in accordance with the present invention;

DESCRIPTION OF A PREFERRED EMBODIMENT

Figure 2:
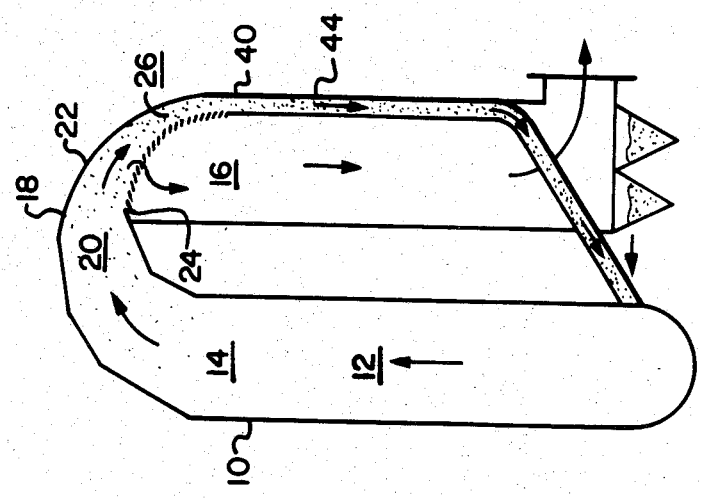
FIG. 2 is a side elevational view of an alternate embodiment of a fluidized bed boiler system incorporating a non-cyclonic solids separator in accordance with the present invention.

Referring now to the drawings, there is depicted therein a fluidized bed furnace 10 wherein a sulfur containing fuel, such as particulate coal, is combusted in a fluidized state with additional particulate material which includes a sulfur oxide absorbent. The particulate fuel is combusted in the fluidizing air within the combustion chamber 12 defined by the furnace enclosure 10 to generate a hot flue gas which exits the combustion chamber 12 through the furnace gas outlet 14. The hot flue gas leaving the combustion chamber 12 through the furnace gas outlet 14 is passed to the flue gas vent duct 16 for venting to the atmosphere. Typically, convection surface, not shown, is disposed in the flue gas vent duct 16 to cool the gas prior to venting the flue gas to the atmosphere through a stack, not shown.

As the particulate fuel in a circulating or fast fluid bed is combusted in a fluidized state in a fluidizing gas having a velocity sufficient to not only fluidize but also entrain a substantial portion of the particulate material present within the combustion chamber 12, the particulate material entrained in the flue gas leaving the combustion chamber 12 through the gas outlet 14 must be removed from the flue gas stream prior to venting the flue gas stream to the atmosphere. In typical prior art circulating fluidized bed furnace systems, a cyclone separator was typically disposed downstream of the furnace gas outlet 14 intermediate the combustion chamber and the flue gas vent duct to remove a major portion of the particulate material for recycle to the furnace chamber. The flue gas passing through the flue gas vent duct 16 would still contain some particulate material which would be typically removed from the flue gas stream by passing the flue gas stream through a fabric filter type collector prior to venting the flue gas through the stack. As noted previously, it would be advantageous to eliminate the cyclone separator in favor of a much simpler and lower capital cost separation means.

Figure 1:
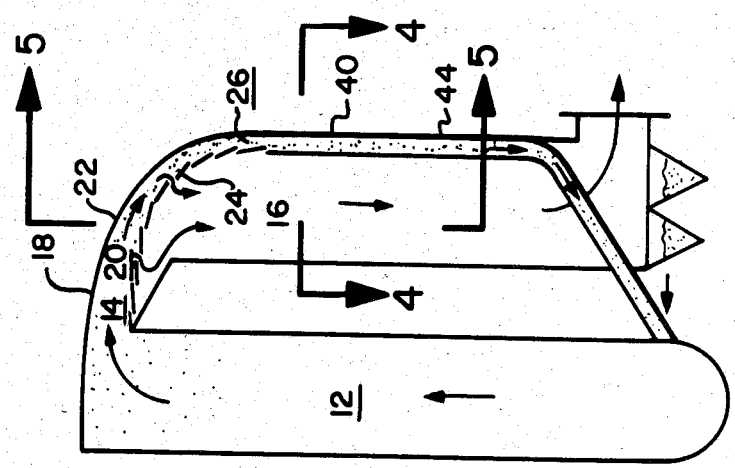
FIG. 1 is a side elevational view illustrating a fluidized bed combustor incorporating an integral non-cyclonic solids separator in accordance with the present invention.

In accordance with the present invention, the means 18 for separating the particulate solids carried over from the combustion chamber in the flue gas passing through the furnace gas outlet 14 comprises an integral part of the furnace system in the form of an arcuate duct 20 having an inlet opening to the gas outlet 14 of the furnace enclosure 10 for receiving the hot flue gas from the combustion chamber 12. The arcuate duct 20 is formed of a curvilinear outer wall 22, a curvilinear inner wall 24, and a pair of spaced sidewalls extending transversely therebetween. It is to be understood that "inner wall" refers to the curvilinear wall of the arcuate duct having the lesser radius of curvature, while "outer wall" refers to the curvilinear wall of the arcuate duct having the greater radius of curvature. In the embodiment shown in FIG. 1, the furnace gas outlet 14 of the furnace 10 is in a vertical plane and the arcuate duct 20 of the separator means of the present invention comprises a downwardly curved duct subtending an angle of 90 degrees between a vertically disposed inlet mating with the furnace gas outlet 14 and a horizontally disposed solids outlet 26. In the embodiment shown in FIG. 2, the furnace gas outlet 14 is in a horizontal plane and the arcuate duct 20 of the separator means of the present invention comprises a semi-torodial duct subtending an angle of 180 degrees between a horizontally disposed inlet mating with the furnace gas outlet 14 and a horizontally disposed solids outlet 26 spaced therefrom at the opposite end of the duct. In the embodiment shown in FIG. 3, the furnace gas outlet 14 is in a horizontal plane and the arcuate duct 20 of the separator means of the present invention comprises a downwardly curved duct subtending an angle of 90 degrees between a horizontally disposed inlet mating with the furnace gas outlet 14 and a vertically disposed solids outlet 26.

A portion of the curvilinear inner wall 24 of the arcuate duct 20 is disposed across the inlet to the flue gas duct 16 and has a plurality of openings 28 therein which provide a flow area through which a first portion of the hot flue gases pass from the arcuate duct 20 of the separator means to the flue gas duct 16. Gas-solids separation is accomplished in the separator means of the present invention as the flue gas turns sharply from its arcuate path through the duct 20 to pass through the openings 28 in the curvilinear inner wall 24 of the duct. Due to the centrifugal forces exerted on the particulate solids in the flue gas as it passes through the arcuate duct 20, the particulate solids have sufficient momentum that they continue along their arcuate path through the duct 20 and are unable to follow the flue gas as it turns sharply from its arcuate flow path to pass through the holes 28 in the curvilinear inner wall of the duct 20. The flue gas having passed through the curvilinear inner wall 24 of the arcuate duct 20 enters the flue gas vent duct 16 at a significantly reduced solids content. This reduced solids content flue gas continues through the flue gas vent duct 18 over convective cooling surface disposed therein and is, if necessary, passed therefrom to a fabric filter or multiclone mechanical separator for further removal of particulate material prior to venting to the atmosphere through a stack, not shown.

The substantial portion of solid particulate material in the hot flue gas passing from the furnace chamber through the furnace gas outlet 14 passes through the solids outlet 26 of the arcuate duct 20 into solids collection means 40 which opens to the solids outlet 26 of the arcuate duct 20 at the end of the arcuate duct opposite from the inlet thereto. These solids are concentrated and entrained in a second minor portion of the flue gas passing through the arcuate duct 20 and are carried through the solid collection means 40 and recycled back to the combustion chamber 12 within the furnace enclosure 10. It is necessary and advantageous to recycle this particulate material as it will contain unburned particulate fuel and also unutilized particulate sulfur absorbent.

Solids separation is also enhanced in accordance with Applicants' invention in that the separator means is in the form of an arcuate duct having a curvilinear outer wall. As a result of this duct configuration, the solids within the flue gas passing from the furnace gas outlet 14 are drawn by centrifugal forces to concentrate in the flue gas passing along the outer wall of the arcuate duct 14 and away from the portion of the flue gas which will pass along and through the inner wall of the arcuate duct 20.

Figure 4:
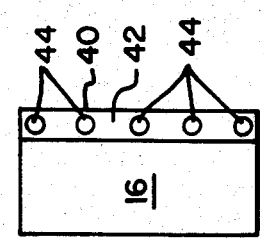
FIG. 4 is a cross-sectional plan view taken along line 4—4 of FIG. 1.
Figure 5:
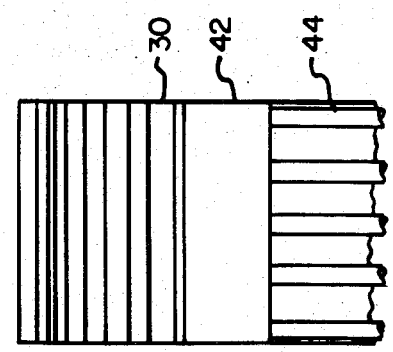
FIG. 5 is a sectional elevation view taken along line 5—5 of FIG. 1.

As best seen in FIGS. 4 and 5, the solids outlet 26 of the arcuate duct 20 opens at the base of the curvilinear outer wall 22 to the solids collection means 40 which preferably comprises a receiving hopper 42 and a plurality of downcomer conduits 44 which extend downwardly from the receiving hopper 42 and thence interconnect with the furnace enclosure 10 to open to the combustion chamber 12 thereby providing a flow path through which the particulate solids entrained in the second minor portion of the flue gas passing through the arcuate duct 20 are reinjected into the furnace chamber. As the particulate solids and flue gas passing through the downcomer conduits 44 will be at a high temperature since they have not traversed any cooling surface in that they have bypassed the flue gas vent duct 16, it is desirable to provide internal or external cooling means operatively associated with one or more of the downcomer conduits 44, such as the internally disposed cooling coil 46 illustrated in FIG. 3, so as to cool the solids prior to reinjection into the furnace chamber and take advantage of the heat content contained therein to heat a liquid or a vapor for useful purposes.

In the preferred embodiment of the present invention, the portion of the curvilinear inner wall 24 of the arcuate duct 20 disposed across the inlet to the flue gas duct 16 is formed of a plurality of spaced louver vanes 30 disposed transversely between the spaced sidewalls of the arcuate duct 20 so as to provide a plurality of openings therebetween. The louvers 30 are disposed so as to extend at an acute angle to the local tangent to the curvilinear inner wall so that the flue gas passing through the arcuate duct along a path substantially parallel to the curvilinear inner wall 24 of the arcuate duct 20 must turn sharply back upon itself to pass through the openings between adjacent louver vanes 30. As mentioned previously, the solid particles in the flue gas are, due to their momentum, unable to traverse the sharp turn traversed by the flue gas passing through the curvilinear inner wall and instead pass onwardly through the arcuate duct 20 to the solids outlet 26 thereof.

It is also preferred that the cross-sectional area of the arcuate duct 20 continuously decrease in flow area in the direction of flue gas flow at least through that portion of the duct bounded by the perforated portion of the curvilinear inner wall 24 disposed atop the flue gas duct 16. If the cross-sectional area of the duct 20 remained constant, the velocity of the flue gas passing therethrough would decrease as a first portion of the flue gas passes through the perforated floor in the flue gas duct. As a consequence, the momentum of the particulate solids in concentrating in second portion of the flue gas would decrease as the velocity of the flue gas decreases resulting in the potential for premature precipitation of the particulate solids within the arcuate duct 20. This result is avoided by continuously decreasing the cross-sectional area of the arcuate duct 20 as the first portion of the flue gas vents through the perforated inner wall 24 into the flue gas duct 16 such that the velocity of the second portion of the flue gas remains high enough to maintain the particulate solids therein in an entrained state so as to carry the solids into the solids collection means 40.

Figure 6:
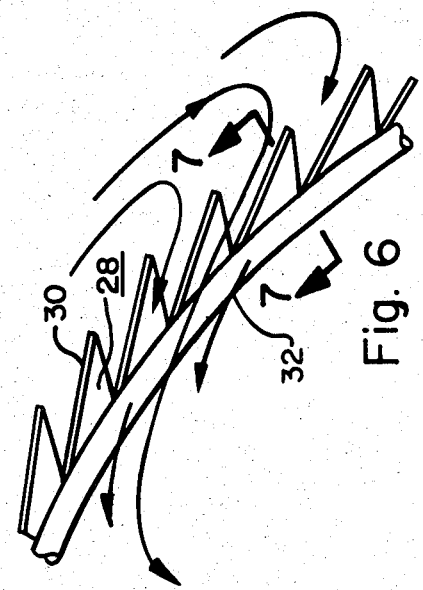
FIG. 6 is a enlarged sectional elevational view showing a curvilinear floor portion of the solid separator wherein the floor portion is formed of a plurality of louvers.
Figure 7:
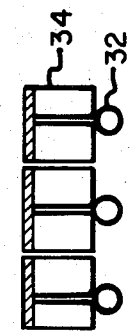
FIG. 7 is a cross-sectional view taken along line 7—7 of FIG. 6.

Although the louver vanes 30 may take many forms of construction, in the presently preferred embodiment, as best seen in FIGS. 6 and 7, the individual louver vanes 30 are mounted to curvilinear fluid cooled tubes 32 at an acute angle with the curvilinear tube 32 to form the portion of the curvilinear inner wall 24 which is disposed atop the flue gas duct 16. Further, as shown in FIG. 6, each louver vane 30 may be formed of a plurality of segments 34 disposed in side by side relationship across the inner curvature of the arcuate duct 20 with each individual segment mounted to a fluid cooled tube 32 as opposed to being a single integral louver vane extending across the inner wall 24 of the duct 20. The louver vanes 30 may be made of ceramic or metal as appropriate for each given installation.

A particular advantage of the louver vane wall design of Applicants' invention is that the louver vanes 30 are disposed at a fairly small arcuate angle with the gas flow such that the surface of the vanes will not be exposed to significant erosive impact from particulate solids in the flue gas passing through the curvilinear duct. Impact type separators used in the prior art are necessarily exposed to high erosion as the particles themselves impinge directly upon the separator in order to slow their momentum so that they will separate from the gas stream. Also, in prior art cyclonic type separators, the whirling flow of particulate solids within the separator creates high erosion of the walls of the cyclone separator. The separator means of the present invention is not subject to the highly erosive effects of the particles as the particles do not directly impact upon the surface but rather flow along a curvilinear path through the arcuate duct of Applicants' separator. Applicants' separator depends upon the centrifugal momentum of the particles generated when the flue gas passes from the furnace outlet through the arcuate duct and upon the perforated curvilinear inner wall requires the flue gas to sharply turn in order to pass through the openings in the inner wall which results in the solids to inherently separate from the flue gas.

We claim:

1. A fluidized bed combustor system for combusting a particulate fuel comprising:
   a. a furnace enclosure defining a combustion chamber for burning a particulate fuel in a fluidized state in a fluidizing gas to generate a hot flue gas and having a gas outlet above said bed for passing the hot flue gas from the combustion chamber;
   b. a flue gas duct disposed downstream of the furnace enclosure having an inlet for receiving the flue gas generated in the combustion chamber;
   c. separator means for separating particulate solids carried over from the combustion chamber in the flue gas, said separator means comprising an arcuate duct having an inlet opening to the gas outlet of the furnace enclosure for receiving the hot flue gas from the combustion chamber and an outlet spaced from said inlet and interconnected to said inlet by a curvilinear inner wall, a curvilinear outer wall, and a pair of spaced sidewalls extending therebetween, a portion of the curvilinear inner wall being disposed across the inlet to flue gas duct, said portion having a plurality of openings therein providing a flow area through which a first portion of the hot gas passes from the arcuate duct of the separator means through the inlet to the flue gas duct; and
   d. solids collection means opening to the outlet of the arcuate duct of the separator means for receiving a second portion of the flue gas together with the particulate solids separated from the first portion of the flue gas passing through the inner wall of the arcuate duct of the separator means.

2. A fluidized bed combustor system as recited in claim 1 wherein the curvilinear inner wall of the arcuate duct of the separator means disposed across the inlet to the flue gas duct comprises a plurality of spaced louvers disposed transversely between the spaced sidewalls of the arcuate duct so as to provide a plurality of openings therebetween, each of said louvers disposed at an acute angle with a tangent to the curvilinear inner wall at its location whereby the flue gas passing through the openings between the plurality of louvers changes its direction of flow while the particulate solids carried in the flue gas separate therefrom and continue traveling an arcuate flow path through the separator means.

3. A fluidized bed combustor system as recited in claim 2 wherein the arcuate duct of the separator means has a cross-sectional area which continuously decreases in flow area in the direction of flue gas flow therethrough.

4. A fluidized bed combustor system as recited in claim 1 wherein the arcuate duct of the separator means comprises a downwardly curved duct subtending an angle of 90 degrees between a vertically disposed inlet and a horizontally disposed outlet.

5. A fluidized bed combustor system as recited in claim 1 wherein the arcuate duct of the separator means comprises a curvilinear duct subtending an angle of 180 degrees between a horizontally disposed inlet and a horizontally disposed outlet.

6. A fluidized bed combustor system as recited in claim 1 wherein the solids collection means comprises at least one downcomer conduit connected to the outlet of the arcuate duct for receiving the second portion of the flue gas passing through the outlet of the arcuate duct together with the particulate solids carried therein, the downcomer conduit providing a flow path through which the second portion of the flue gas and the particulate solids carried therein are conveyed for discharge into the combustion chamber of the furnace enclosure.

7. A fluidized bed combustor system as recited in claim 6 further comprising a conduit cooling means associated with at least one downcomer conduit for cooling the particulate solids passing therethrough.

* * * * *